J. C. BEEM.
MILKING MACHINE.
APPLICATION FILED OCT. 4, 1918.

1,377,546.

Patented May 10, 1921.
5 SHEETS—SHEET 1.

Inventor
J. C. Beem.
By
Lacey & Lacey Attorneys

J. C. BEEM.
MILKING MACHINE.
APPLICATION FILED OCT. 4, 1918.

1,377,546.

Patented May 10, 1921.
5 SHEETS—SHEET 3.

Inventor
J. C. Beem

By Lacey & Lacey, Attorneys

UNITED STATES PATENT OFFICE.

JOHN C. BEEM, OF SAWTELLE, CALIFORNIA.

MILKING-MACHINE.

1,377,546.  Specification of Letters Patent.  Patented May 10, 1921.

Application filed October 4, 1918. Serial No. 256,846.

*To all whom it may concern:*

Be it known that I, JOHN C. BEEM, a citizen of the United States, residing at Sawtelle, in the county of Los Angeles and State of California, have invented certain new and useful Improvements in Milking-Machines, of which the following is a specification.

This invention relates to milking machines.

One object of the present invention is to provide a milking machine of such construction that the same may be employed in milking two cows simultaneously, means being provided whereby the milking of either cow may be discontinued at the will of the operator without interfering in any way with the operation of the machine in continuing the milking of the other cow.

Another object of the invention is to provide a milking machine which will be light in weight and compact and may be carried about and readily and easily operated by hand.

A further object of the invention is to provide a milking machine which will deliver the milk in a steady stream and will likewise draw down the milk in a steady and gentle manner not liable to cause annoyance to the cows.

The machine embodying the present invention operates on the principle of a double acting pump, and a further object of the invention is to provide means for preventing improper operation of the pumping apparatus so that there will be no likelihood of the milk being forced toward the cows from the pail. In this respect the invention contemplates the provision of means for preventing operation of the pump through less than a full stroke prior to a return stroke.

A further object of the invention is to provide in a machine of this class, pumping apparatus which will be sanitary in every respect and which may be readily cleansed and aired or sunned without disassembling the entire machine.

The invention also has as one of its objects to provide in a machine of this class, pumping apparatus in which friction will be reduced to the minimum and there will be no contact of the milk with any moving parts in rubbing contact. Of course, if, in a machine of this class, an ordinary cylinder and piston should be employed, the milk would be contaminated by the lubricant and the worn off particles of metal resulting from the frictional rubbing contact of the piston with the walls of the cylinder, and therefore the present invention contemplates the provision of a pump which will be free from the disadvantages which would attend the use of an ordinary cylinder and piston pump.

The pumping apparatus of the present invention, briefly described, includes a reciprocating piston, and receiving chambers located at the opposite sides of the piston and each having a combined inlet and outlet port, and a further object of the invention is to provide a novel valve device for automatically establishing communication between the said ports and the intake tube for the milk and the discharge tube therefor, the said valve device being automatically actuated through reciprocation of the piston.

The machine embodying the present invention is fixedly mounted upon a bench indicated in the drawings by the numeral 1 and having a seat 2 for the operator of the machine, the bench being supported by legs 3 which may be provided at their lower ends with spurs 4 to prevent shifting about of the bench while the machine is being operated. As the bench constitutes no part of the present invention, it need not be further specifically described.

Substantially the entire mechanism of the invention is housed within a casing which is indicated in general by the numeral 5 and which is secured in any suitable manner to a base board 1ª removably secured, as will be presently described, upon the top of the bench 1. This casing includes side walls 6, a top wall 7, and end walls 8 and may be of sheet metal or any other suitable material. The pump, aside from the valve devices associated therewith, includes in its structure, a piston indicated in general by the numeral 9, a casing 10, and receiving chambers indicated in general by the numeral 11 and which chambers are of rubber or other elastic material and are connected with the piston and with heads which close the casing 10. The casing 10 is substantially cylindrical and the piston reciprocates therein, but unlike an ordinary cylinder and piston pump, the casing 10 does not constitute a pump cylinder but is provided for the purpose of preventing distention or bulging of the walls of the receiving chambers when under pressure. The said piston head comprises an intermediate disk 12 which is circular and of a diameter to nearly exactly fit within the casing 10, and other disks 13 disposed at the opposite side of the disks 12 and secured thereto by means of suitable bolts or other fastening devices 14. Each receiving chamber 11 is, as before stated, of rubber or other elastic material and each chamber comprises a wall 15 which, when the chambers are assembled in the complete machine, maintains a substantially cylindrical form, the wall 15 being of such length that folding of the same is not permitted. Each chamber 11 furthermore has a substantially closed end 16, and in assembling the chambers with the piston, the closed ends 16 of the chambers are disposed against the opposite flat faces of the disk 12 of the piston head, and the disks 13 are then inserted within the chambers and positioned against the said ends 16 thereof after which the bolts 14 are threaded into place so as to firmly unite all of the parts, the closed ends 16 of the chambers being, of course, bound between the disk 12 and the respective disks 13. Each end of the casing 10 is closed by a head, and each of these heads comprises a plate 17 provided upon its inner face with a boss 18 of a contour and size to fit within the respective end of the casing 10, screws or other suitable fastening elements 21 being secured through the ends of the wall of the casing and into the edge of the boss for the purpose of securing the parts together. The plates 17 are provided at their lower ends with attaching bases 19ª which are secured to the upper face of the base board 1ª and in this manner the casing 10 is fixedly supported above the said base board. Each head of the casing further includes a ring 20 which is disposed within the respective end of the casing 10 and which ring is secured to the inner face of the respective plate 17 by means of screws or other fastening elements 21. The outer ends of the chambers 11 are open, and the walls of the said chambers at their said ends are turned inwardly as at 22 and are disposed between the plate 17 and the respective ring 20 and clamped in place when the bolts or screws 21 are tightened. The rings 20 are, of course, received within the open ends of the chambers 11 and in order to prevent tearing of the walls of the chambers or pinching of the said walls, it is preferable that each ring 20 be exteriorly tapered toward its inner end, as indicated by the numeral 23, and that the ring be rounded as at 24 at its outer end for the same purpose. It is also preferable that the peripheries of the disks 13 of the piston head be, for the purpose stated, slightly rounded as indicated by the numeral 25. The rings 20 are exteriorly nearly of a diameter equal to that of the casing 10 and interiorly the rings are cylindrical and each is threaded at its outer end as indicated by the numeral 26. The opening of each ring registers with an opening 27 formed in the respective plate 17, and each head is completed by a plug 28 which is fitted into the ring 20 and is exteriorly threaded near its outer end, as indicated by the numeral 29, so as to engage the threads 26 of the said ring. A hand grip 30 is provided upon the outer end of each plug so that the plug may be threaded into and out of the opening in the ring 20 and plate 17, and thus access may be had to the interior of the receiving chambers 11 for the purpose of cleansing these chambers and also to permit of airing or sunning of the same. It is preferable that each plug 28 at its outer end be provided with an outstanding circumferentially extending flange 31 adapted to seat within a rabbet 32 formed in the outer face of the plate 17 and surrounding the opening 27 in the said plate, a packing washer 33 being interposed between the bottom of the rabbet and the said flange 31.

Figure 3:
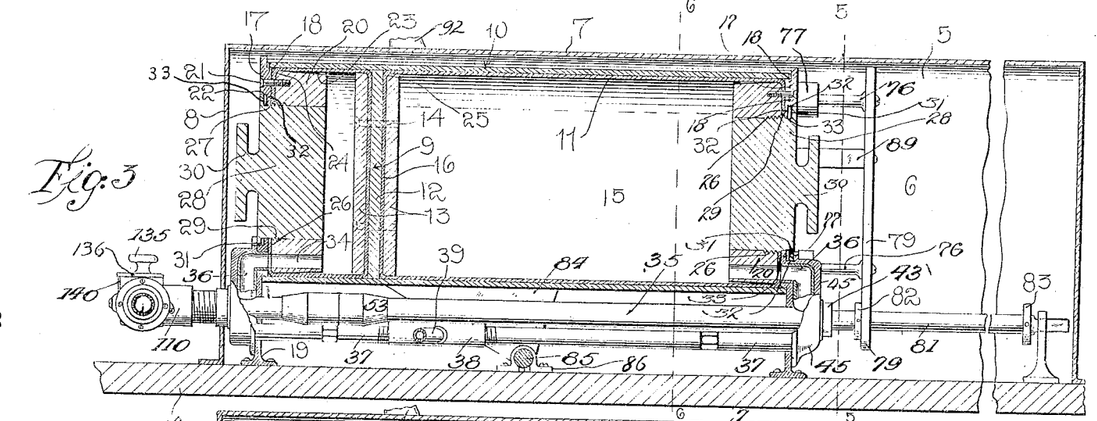
Fig. 3 is a vertical longitudinal sectional view through the machine.

Each ring 20 is formed with a combined inlet and outlet port indicated by the numeral 34, and these ports are controlled by a valve device which will now be described. The casing of the valve device is indicated in general by the numeral 35 and the same is of tubular form as clearly shown in Fig. 14 of the drawings. This casing is arranged to extend beneath the casing 10 and through the plates 17 of the heads of the latter casing, as shown in Fig. 3 of the drawings. Near each end, the valve casing 35 is provided with an upwardly extending branch pipe 36 and these branch pipes or tubes communicate with the respective ports 34 and thus establish communication between the valve device and the receiving chambers of the pumping device. Pipes 37 lead downwardly from the ends of the valve casing 35 at points opposite the lower ends of the pipes 36, and the said pipes 37, which are the discharge pipes for the milk, are connected together by a sleeve 38 as clearly shown in Fig. 11 of the drawings. An outlet or discharge pipe 39 leads from one side of the sleeve 38 between the ends thereof, and slidably mounted within the sleeve is a valve 40 comprising a body of a diameter to fit snugly and yet slidably within the said sleeve 38 and having concave faces 41. The valve 40 is capable of sliding movement in the sleeve to position at either side of the discharge pipe 39 and is adapted to be limited in its sliding movement by abutment against the ends of the pipes 37. Thus if milk is being delivered from the machine through one of the pipes 37 and is discharged into the sleeve 38, the valve 40 will be immediately shifted in the sleeve to position closing the other pipe 37 so that the milk will flow from the sleeve through the pipe 39 and none will enter the other pipe 37. In order that the valve casing 35 may be secured in place, the rear end of the casing is exteriorly threaded, as indicated by the numeral 42, and a nut 43 is fitted thereon and tightened against a washer 44 which bears against a cap plate 45 disposed against the rear plate 17 and housing the respective pipe 36 and the end of the respective pipe 37. Likewise the forward end of the valve casing is exteriorly threaded as indicated by the numeral 46 and fitted thereon is a nut 47 bearing against a washer 48 seated against a corresponding cap plate on the forward plate 17. The last-mentioned end of the valve casing, however, is extended beyond the nut 47, as clearly shown in Fig. 14 of the drawings, so as to provide for the connection therewith of the tubes which lead from the teat cups as will be presently explained.

The valve which operates within the casing 35 is indicated in general by the numeral 49 and the same comprises sections one indicated by the numeral 50 and the other by the numeral 51. These sections 50 and 51 are tubular and are connected together at their inner or adjacent ends in a manner which will now be described. The valve casing 35 is enlarged in diameter between its ends as indicated by the numeral 52, this enlargement being substantially cylindrical throughout its intermediate portion and being tapered at its ends as at 53. The said inner end of the section 50 of the valve is circumferentially enlarged both exteriorly and interiorly as indicated by the numeral 54, and throughout a portion of its length this enlargement is cylindrical, as indicated by the numeral 55, but inwardly of its cylindrical portion 55 the enlargement is both exteriorly and interiorly tapered as at 56. The end of the portion 55 is interiorly threaded, as indicated by the numeral 57 and fitted therein is the enlarged end 58 of the section 51. In this manner while the sections may be separated for repairs or cleaning, they are under normal conditions connected for movement with each other. In order that the parts may be assembled the portion 52 of the valve casing 35 is preferably divided and the sections thus formed are threaded together, as indicated by the numeral 59. At this point it will be evident that the valve is slidable longitudinally within its casing and may be shifted to assume the position shown in Fig. 14 of the drawings or moved to the left to assume a different position. The exterior taper of the portion 56 of the section 50 of the valve corresponds to the internal taper of the portion 53 of the valve casing so that when the valve is moved to the right or, in other words, rearwardly to the fullest extent, the enlargement of the valve section 50 will seat snugly within the conical bore of the valve casing thereby effectually closing the casing and also limiting the sliding movement of the valve in the said direction. In order to provide a liquid-tight fit between the parts, the portion 54 of the valve section 50 is provided exteriorly with a covering 60 of rubber or any other suitable packing material. The numeral 61 indicates a plug valve having one or both of its ends of conical tapered form, as indicated by the numeral 62, and this plug valve is arranged within the enlargement 54 of the valve sections and is supported in place by means of two screws 63 which are fitted through diametrically opposite sides of the enlarged portion of the valve casing 35 and are threaded into diametrically opposite sides of the body of the plug valve 61. The screws 63 extend through slots 64 formed in the portion 55 of the valve section 50 and in the packing 60, and it will be understood that when the valve is shifted to the left in Fig. 14 or, in other words, in a forward direction, the conical end 62 of the plug valve will fit snugly within the tapered bore or engage snugly in the seat formed by internally tapering the portion 54 of the enlarged end of the said valve section.

Figure 14:
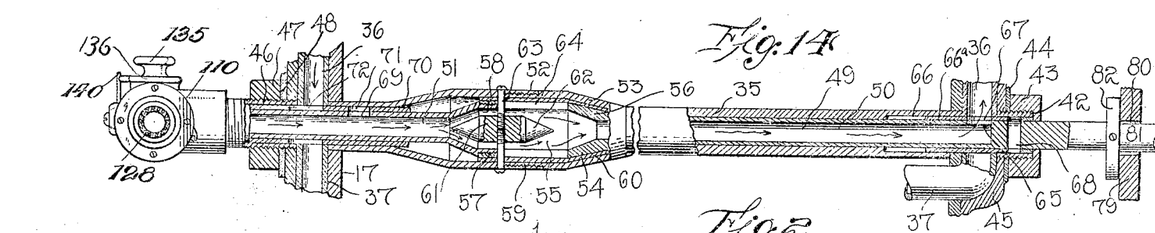
Fig. 14 is a vertical longitudinal sectional view through a portion of the valve device.

At the rear end of the valve, the same is formed in its upper side with a port 65 which registers or communicates with the pipe 36 when the parts are in the position shown in Fig. 14. However, when the valve is shifted to the left in the said figure the port 65 will be moved out of registration with the pipe 36. Throughout the greater portion of its length the valve casing 35 is interiorly of substantially the same diameter as the valve exteriorly and the valve therefore slides within the casing in direct contact with the wall thereof, but near its rear end, the casing 35 is interiorly increased in diameter, as indicated by the numeral 66, so as to accommodate a covering 66ª of rubber or other suitable packing material disposed to surround the valve 49 and secured thereto in any suitable manner. The packing covering 66ª is formed with an opening 67 which registers with the opening 65. The enlargement 66 of the bore of the valve casing is moreover of such length as to permit of free sliding movement of the valve without the said packing covering being displaced. At a point suitably spaced from the opening 67, the packing covering and the solid end portion of the valve 49 are formed with registering openings as indicated by the numeral 68 so that the liquid may pass through the valve when the valve is slid to position with the opening 68 in registration with the end of the pipe 36. The section 51 of the valve is formed with an opening 69 designed, in one position of the valve, to communicate with the respective pipe 36, and the said section of the valve is provided with a covering of packing material indicated by the numeral 70 which fits in a liquid-tight manner within the bore of the corresponding section of the valve casing and is formed with an opening 71 which is shown in registration with the opening 69. The packing is interrupted or omitted outwardly of the opening 71 so as to provide an annular passage 72 about the said section 51 of the valve when the valve is in the position shown in Fig. 14 of the drawings in which position the passage 72 is in communication with the pipe 36.

The means provided for reciprocating the valve at the ends of the piston strokes will now be described. The casing 10 is formed in its wall with any suitable number of outwardly bulged longitudinally extending portions 73 which provide within the casing longitudinally extending grooves 74. The disk 12 of the piston head is provided at intervals in its periphery with outstanding ears 75 which project into the grooves 74. Piston rods 76 are secured at their inner ends to the ears 75 in the manner clearly shown in Fig. 10 of the drawings, and these rods extend through the rear plate 17 and through stuffing boxes 77 upon the said plate. At their rear or outer ends the piston rods 76 are secured as at 78 to a head 79 which, of course, moves with the rods when the piston is reciprocated in the manner and by means to be presently described. The head 79 is formed with an opening 80 and the valve 49 is provided at its rear end with a solid extension 81 which fits loosely through the opening 80 as shown in Fig. 14 of the drawings. Spaced abutments 82 and 83 are fixed upon the extension 81 of the valve and at opposite sides of the head 79. The distance between the abutments 82 and 83 is less than the length of the stroke of the piston so that when the piston has nearly reached one limit of its stroke the head 79 will strike, for example, the abutment 82 and will shift the valve forwardly or to the left in Fig. 14 of the drawings and, when the piston approaches the other end of its stroke the said head 79 will strike the abutment 83 and the valve will then be shifted rearwardly or to the right in Fig. 14.

Figure 1:
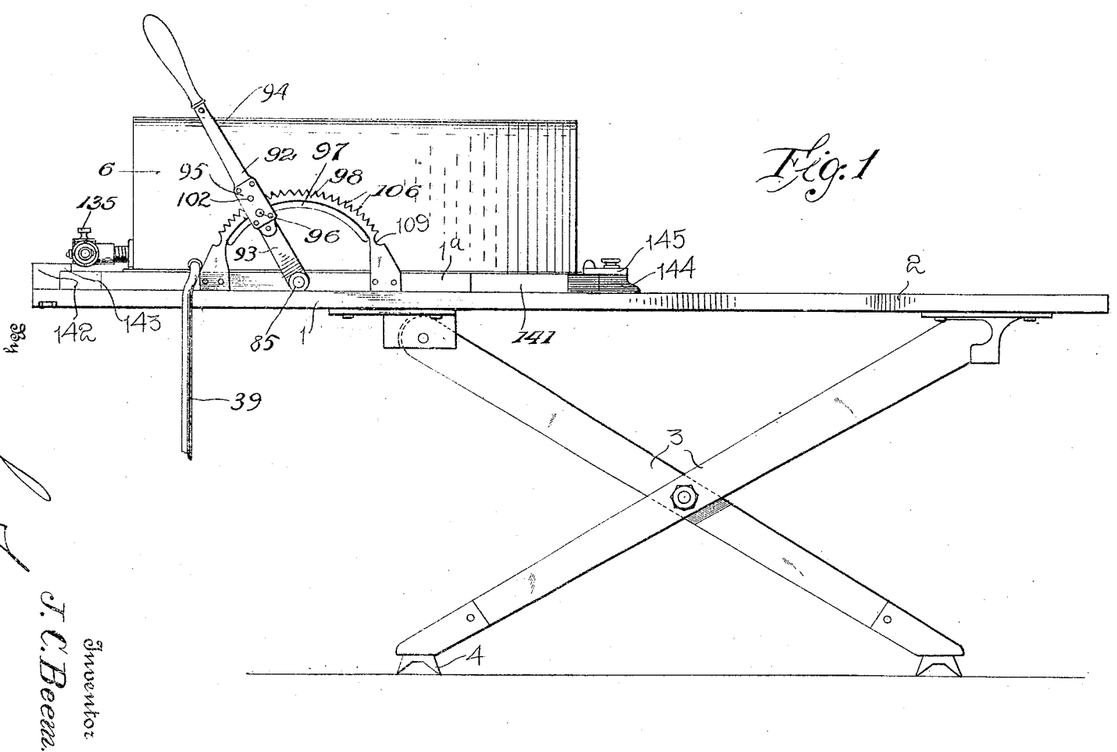
Figure 1 is a side elevation of the machine embodying the present invention.
Figures 2, 15, 16, 17, 18:
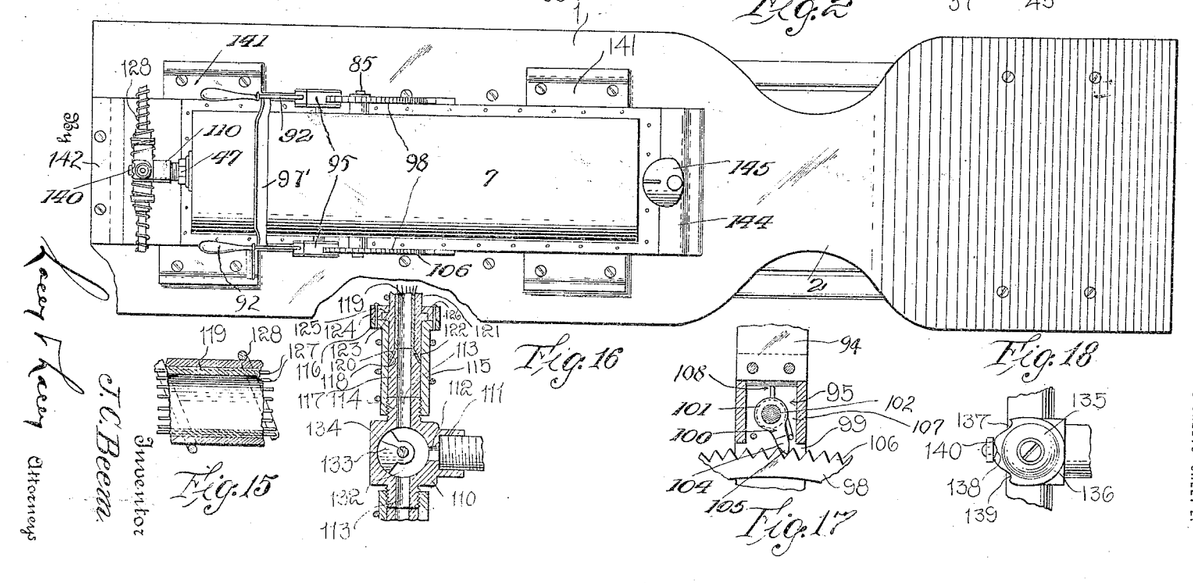
Fig. 2 is a top plan view thereof.
Fig. 15 is a detail longitudinal sectional view through a portion of one of the milk conducting tubes.
Fig. 16 is a detail horizontal sectional view through the cut-off valve by which the milking of one of two cows may be discontinued.
Fig. 17 is a detail vertical sectional view illustrating the manner in which the pawl shown in Fig. 13 coacts with the rack.
Fig. 18 is a top plan view of the valve shown in Fig. 16.
Figure 4:
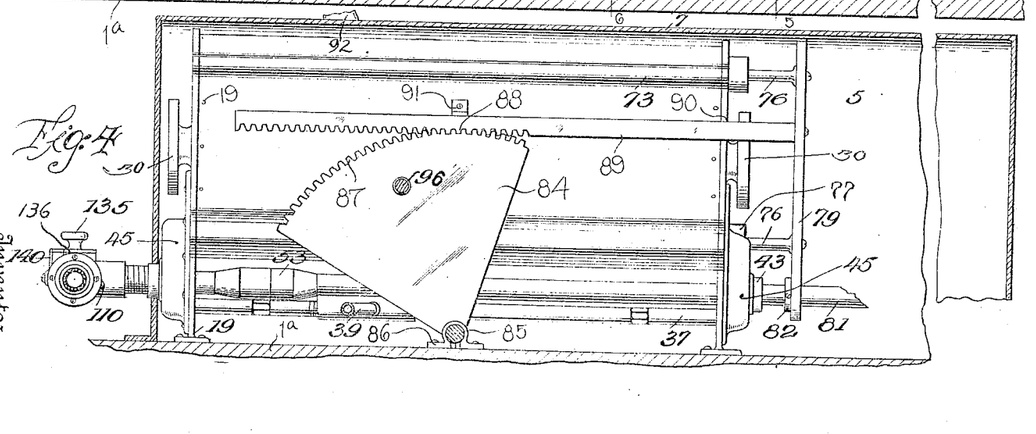
Fig. 4 is a detail side elevation of the machine, the casing therefor being shown in section.
Figure 5:
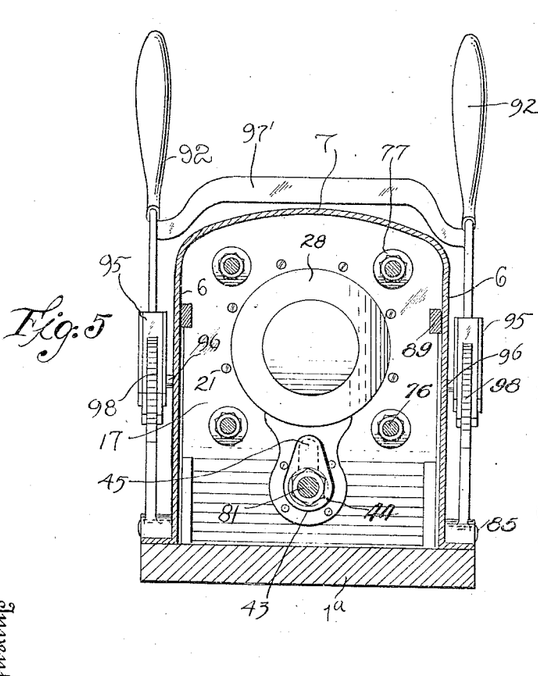
Fig. 5 is a vertical transverse sectional view taken substantially on the line 5—5 of Fig. 3.
Figure 6:
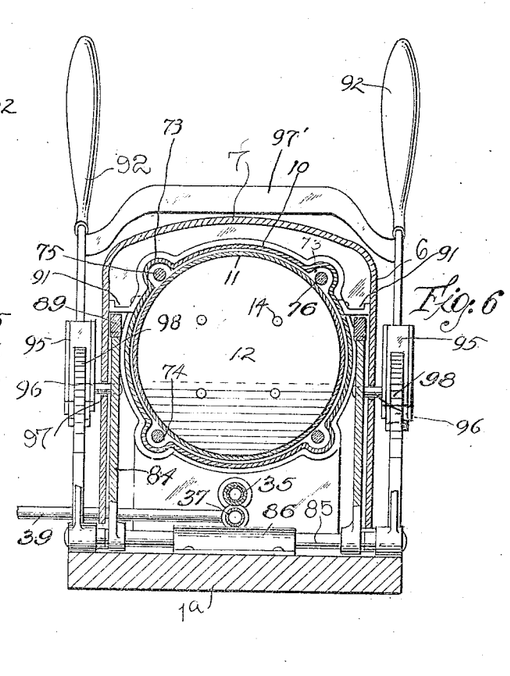
Fig. 6 is a similar view taken on the line 6—6 of Fig. 3.
Figures 7, 8, 9, 10, 11, 12, 13:
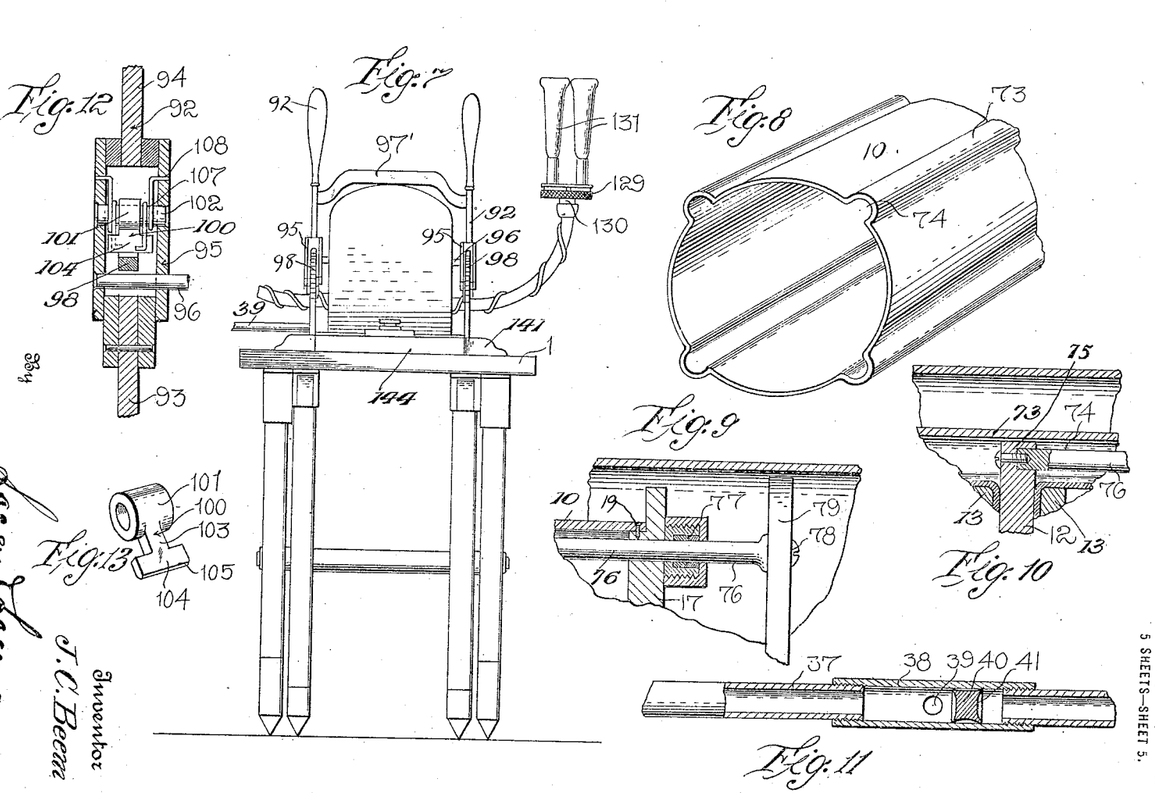
Fig. 7 is a rear end elevation of the machine.
Fig. 8 is a fragmentary perspective view of the casing member within which the receiving chambers are housed.
Fig. 9 is a detail longitudinal sectional view illustrating the arrangement of one of the piston rods.
Fig. 10 is a similar view illustrating a portion of the piston.
Fig. 11 is a longitudinal sectional view illustrating a portion of the valve device.
Fig. 12 is a vertical transverse sectional view through a portion of one of the operating levers and the rack with which the same coacts.
Fig. 13 is a perspective view of the pawl shown in Fig. 12.

The means provided for reciprocating the piston of the machine includes segmental gears 84, shown in Figs. 4 and 6, secured to a rock shaft 85 mounted in suitable bearings 86 upon the base 1ª, and extending transversely beneath the middle of the casing 10. The segmental gears 84 are located within the casing 5 and beside the side walls 6 of the said casing, and the teeth 87 of the gears mesh with the teeth 88 of rack bars 89 which are secured at their rear ends to the head 79, these bars working through slots 90 formed in the opposite side edges of the plate 17 at the rear end of the casing 10 and being held against upward displacement by means of suitable guide lugs 91 upon the opposite sides of the said casing 10, and which lugs extend above the upper edges of the said rack bars 89. Hand levers indicated in general by the numeral 92 are provided for oscillating the segmental gears 84, and in connection with these hand levers there is provided rack means for preventing backward or return swinging movement of the levers before they have reached the limits of their movements in either direction. The shaft 85 extends at its ends exteriorly of the casing 5 and the levers are secured at their lower ends to the said ends of the shaft. Each of the levers 92 comprises a lower section 93 and an upper section 94 and the upper end of the section 93 is secured within the lower end of a casing for the pawl which is to coact with the ratchet above mentioned and which casing is indicated in general by the numeral 95, shown in Fig. 12, the lower end of the upper section of the lever being secured within the upper end of the said casing 95. In this manner the two sections of each lever are rigidly connected together in alinement. A pin 96 is fitted through the sides of the casing 95 upon each lever and these pins work through arcuate slots 97 formed in the sides of the casing 5, and are secured to the corresponding segmental gears so that when the levers are oscillated, the gears will be correspondingly oscillated and, meshing with the rack bars 89 as previously described, reciprocatory motion will be imparted to the piston. The levers are preferably connected by means of a crossbar 97' so that they will operate in unison, the cross bar extending above the casing 5 in the manner clearly shown in Fig. 7 of the drawings. The numeral 98 indicates a segmental ratchet bar and one of these ratchet bars is mounted upon the bench at each side of the frame 5, and the front and rear walls of each casing 95 are slotted as at 99 to receive the respective ratchet bars 98. Thus the sections of each hand lever occupy the same vertical plane as the respective ratchet bars 98 and the ratchet bars extend through the pawl casings, as clearly shown in Fig. 17 of the drawings. The pawl within each casing 95 is indicated in general by the numeral 100 and comprises a collar portion 101 pivotally fitted to a pin 102 secured at its ends in the opposite side walls of the respective casing 95. A neck or shank 103, shown in Fig. 13, extends from one side of the collar 101 and carries a transverse tooth 104 having its outer edge formed with opposite bevels 105. This edge of the pawl is designed to ride over the teeth 106 of the respective ratchet bar 98 when the machine is in operation. Springs 107, shown in Fig. 12, are coiled about the pin 102 at the opposite ends of the collar 101 and each of these springs has one end anchored as at 108 in the adjacent side wall of the casing 95, the other ends of the springs engaging opposite sides of the tooth 104 of the said pawl so that movement of the pawl upon the pivot pin 102 in either direction is yieldably resisted. At each end of the series of ratchet teeth 106, the arcuate edge of the ratchet bar is formed with a relatively deep notch or recess 109. Referring now to Figs. 1 and 17 of the drawings it will be evident that the hand lever illustrated therein may, when the pawl is in the position shown in the said Fig. 17, be further swung toward the left in the said figure but that the lever cannot be moved in the opposite direction. However, after the lever has been moved to the limit of its stroke the pawl will drop into the adjacent notch 109 and this notch being as stated relatively deep, the pawl will assume a neutral or intermediate position. Therefore when the lever is swung in the reverse direction the pawl will ride over the ratchet teeth 106 and such movement of the lever may be continued until the limit of its movement has been reached although the lever cannot be swung in the first-mentioned direction until after the said limit of movement has been reached and the pawl has been dropped into the other one of the notches 109.

As before stated, the machine is adapted for the simultaneous milking of two cows and means is provided whereby the milking of either cow may be discontinued without interfering with the continued milking of the other cow. In order that this may be accomplished a two-way valve is provided as shown in Fig. 16 of the drawings and as indicated in general by the numeral 110, and the body of this valve is provided upon one side with an interiorly threaded collar 111 designed to be fitted on to the exteriorly threaded end of the valve casing 35, the valve body being further provided with an outlet port 112 communicating with the interior of the collar so that milk drawn into the valve chamber will be delivered through the port into the end of the valve casing and finally into the tubular valve 49. The body of the valve 110 is further provided with two inlet ports 113 formed in exteriorly threaded necks 114 located upon opposite sides of the valve body, the ports communicating with the chamber of the body as clearly shown in the said figure. Fitted onto each of the necks 114 is a nipple 115 provided at its outer end with a flange 116. Fitted and fixed within each nipple 115 is a bushing 117 exteriorly tapered at its outer end as at 118. The numeral 119 indicates a rubber milk conducting tube which at its end is slightly flared as at 120 so as to fit over the tapered end 118 of the bushing 117. A short sleeve 121 is fitted onto the end of the rubber tube 119 and is interiorly flared as at 122 at its inner end so as to coact with the tapered outer end of the bushing 117 and clamp in place the flared end 120 of the said rubber tube, thus firmly anchoring the end of the tube. The sleeve 121 is formed exteriorly with a circumscribing flange 123, and a ring 124 is fitted onto the sleeve and is provided interiorly with an annular rabbet 125 receiving the said flange, the said ring being bolted or otherwise secured as at 126 to the flange 116 of the nipple 115. In order that the rubber tubes may be semirigid so that when bent to extend in any desired direction, they will retain their bent form, non-resilient wires 127 are embedded in the said rubber tube and extend lengthwise thereof, and a larger wire 128 is wrapped spirally about the tube throughout its length. The numeral 129 indicates a teat cup supporting head having a neck 130 to which the outer end of the respective rubber tube is fitted, as shown in Fig. 7 of the drawings, and each of these heads supports teat cups indicated by the numeral 131, and which cups may be of ordinary or any preferred construction.

The chamber within the valve casing 110 is indicated by the numeral 132 and the same is substantially cylindrical in form, and rotatably mounted axially within this chamber is the valve which is indicated by the numeral 133 and which valve is of segmental form, its arcuate side extending throughout slightly less than 180°. The stem of the valve is indicated by the numeral 134 and the valve is fixed to its stem in any suitable manner, the stem being rotatably mounted vertically within the valve casing with its upper end projecting above the casing and provided with a hand knob 135 whereby the valve may be rotated. In order that the valve may be held in any one of its positions of adjustment, a disk 136 is connected for rotation with the valve stem 134 above the top of the valve casing and is formed in its periphery with notches 137, 138 and 139. A resilient detent finger 140 is fixed upon the outer side of the valve casing and at its free end projects into engagement with the periphery of the disk 136, the finger being adapted to engage by its resiliency in the notches when the valve and its disk are rotated.

The operation of the machine is as follows: Let it be assumed that the parts are in the positions shown in the several figures of the drawings, particular reference being had to Figs. 3 and 14. Also let it be assumed that the piston 9 is moving to the left and has nearly completed its stroke. Under these conditions milk is being drawn into both of the milk conducting tubes 119 into the tubular valve 50 and is flowing in the direction indicated by the arrows in Fig. 14, through the said tubular valve, around the plug valve 61, through the port 65 and pipe 36, and into the right hand one of the receiving chambers in Fig. 3. As the piston completes its stroke, however, the head 79 will strike the abutment 82 and will shift the valve 49 to the left in Fig. 14 thus moving the port 65 out of registration with the pipe 36, bringing the passage 68 into communication with the said pipe and the right hand pipe 37, and also moving the passage 72 out of communication with the left hand pipe 36 and the left hand pipe 37 and bringing the port 69 into registration with the said left hand pipe 36. Also in this movement of the valve the tapered end of the plug valve 61 will seat thus closing the valve 49 to flow of milk therethrough past the said plug valve. Upon the return stroke of the piston 9, the milk which has been drawn into the right hand receiving chamber will be forced out through the respective pipe 36, through the passage 68 and through the respective pipe 37 to the outlet. Also due to the suction created in the left hand receiving chamber, milk will be drawn in through the left hand end of the valve 49 and through the port 69 into the respective pipe 36 and through the port 34 into the said left hand receiving chamber. Of course, when the piston reaches the end of its right hand stroke the head 79 will engage the abutment 83 and the valve will be returned to the position shown in Fig. 14. When the cut-off valve is in the position shown in Fig. 16 of the drawings, milk will be drawn in through both of the milk conducting tubes 119, but should it be desired to discontinue the milking of either of the two cows, the valve may be turned so as to close the respective one of the ports 113, thus cutting off the suction through this port.

The base board 1ᵃ may be removably secured upon the upper side of the top 1 of the bench in any suitable manner but preferably pairs of cleats 141 are secured upon the said top of the bench at the opposite sides thereof and between which cleats the base board may be disposed, as clearly shown in Fig. 2 of the drawings, to prevent lateral displacement of said board, a cleat 142 being secured to the top of the bench at the forward end thereof and provided with a portion 143 designed to engage over the corresponding end of the base board to prevent upward displacement of this end of the said board. A cleat 144 is also secured upon the top of the bench and serves as an abutment for the rear end of the said base board, and a turn-button latch 145 is swiveled upon the cleat 144 and may be turned to position engaging over the said end of the base board as clearly shown in Fig. 1 of the drawings.

Having thus described the invention, what is claimed as new is:

1. In a milking machine, a pump including a piston and receiving chambers at the opposite sides thereof, means for reciprocating the piston, the receiving chambers each having a combined inlet and outlet port, a valve casing, a valve movable in the casing and having sets of inlet and outlet passages and a milk inlet, and means actuated through reciprocation of the piston for simultaneously bringing the inlet passage of one set into communication with the port of one chamber and the outlet of the other set into communication with the port of the other chamber, and vice versa.

2. In a milking machine, a pump including a piston and receiving chambers at the opposite sides thereof, means for reciprocating the piston, the receiving chambers each having a combined inlet and outlet port, a valve casing, a valve movable in the casing and having sets of inlet and outlet passages and a milk inlet, and means for automatically actuating the valve to simultaneously bring the inlet passage of one set into communication with the port of one chamber and the outlet of the other set into communication with the port of the other chamber, and vice versa.

3. In a milking machine, a pump including a piston and receiving chambers at the opposite sides thereof, means for reciprocating the piston, the receiving chambers each having a combined inlet and outlet port, a valve casing having openings in communication with the said ports, a tubular valve movable in the casing and having sets of inlet and outlet passages and a milk inlet, means actuated through reciprocation of the piston for simultaneously bringing the inlet passage of one set into communication with the port of one chamber and the outlet of the other set into communication with the port of the other chamber, and vice versa, and means for automatically closing the bore of the valve when the valve is moved in one direction.

4. In a milking machine, a pump including a piston and receiving chambers at the opposite sides thereof, means for reciprocating the piston, the receiving chambers each having a combined inlet and outlet port, a valve casing having openings in communication with the said ports, a tubular valve movable in the casing and having sets of inlet and outlet passages and a milk inlet, a seat within the bore of the valve, a plug valve fixed with relation to the casing and located within the valve in the path of movement of the seat, and means actuated through reciprocation of the piston for simultaneously bringing the inlet passage of one set into communication with the port of one chamber and the outlet of the other set into communication with the port of the other chamber, and vice versa, the movement of the valve in one direction bringing its seat into coöperative relation to the said plug valve.

5. In a milking machine, a pump including a piston and receiving chambers at the opposite sides thereof, means for reciprocating the piston, the receiving chambers each having a combined inlet and outlet port, a valve casing having openings in communication with the said ports, a tubular valve movable in the casing and provided in its portion adjacent one port with an inlet passage communicating with its interior and with a passage extending about it and similarly provided in its portion adjacent the other port with an inlet passage communicating with its interior and with an outlet passage extending about it, and means actuated through reciprocation of the piston to shift the valve to successively bring its inlet and outlet passages into communication with the said ports, and vice versa.

6. In a milking machine, a pump including a piston and receiving chambers at the opposite sides thereof, means for reciprocating the piston, the receiving chambers each having a combined inlet and outlet port, a valve casing having openings communicating with the said ports, a discharge pipe having branches communicating with the valve casing, a valve shiftable in the discharge pipe at the juncture of the pipe and its branches and arranged when shifted in either direction to close the corresponding branch, a valve movable in the said valve casing and having sets of inlet and outlet passages and a milk inlet, and means actuated through reciprocation of the piston for simultaneously bringing the inlet passage of one set into communication with the port of one chamber and the outlet of the other set into communication with the port of the other chamber and the respective branch of the discharge pipe, and vice versa.

7. In a milking machine, a pump including a piston and receiving chambers at opposite sides of the piston and having their walls connected therewith and elastic, the said chambers having relatively fixed heads to which their walls are also connected, the elastic walls being of such length as not to permit folding thereof, each of the heads having an inlet and outlet port, means for reciprocating the piston to alternately expand and contract the said chambers, and valve means for controlling the said ports of the chambers.

8. In a milking machine, a pump including a receiving chamber comprising a fixed head and an elastic closed wall connected therewith, said wall retaining its cylindrical form at all times and being of such length as not to permit folding thereof, a piston to which the wall is also connected, the said chamber having an inlet and outlet port, valve means for controlling the port, and means for reciprocating the piston.

9. A pump including spaced fixed heads and an intermediate reciprocating piston, cylindrical elastic closed walls connected with the heads and with the piston and lying at the opposite sides of the piston, the heads and the piston completely filling the respective ends of the cylindrical walls and said walls being capable of elongation and contraction without change of diameter at any point of their length and being of such length as not to permit folding thereof, means for reciprocating the piston, the heads having inlet and outlet ports, and valve means for controlling the ports.

10. A pump including spaced fixed heads and an intermediate reciprocating piston, cylindrical elastic closed walls connected with the heads and with the piston and lying at the opposite sides of the piston, means for reciprocating the piston, the heads having inlet and outlet ports, and valve means for controlling the ports, each of the heads comprising a fixed section having an opening and a section constituting a closure for the opening and removable from the first mentioned section.

11. In milking apparatus, milk-receiving chambers, means for alternately creating suction and compression in said chambers, a valve casing having ports communicating with the chambers, and a valve mounted in the casing for reciprocation and having a milk inlet, the valve having ports to communicate with the respective ports of the casing alternately and having by-passes to communicate with the respective ports alternately.

12. In milking apparatus, milk-receiving chambers, means for alternately creating suction and compression in said chambers, a tubular valve casing having ports communicating with the chambers, a tubular valve mounted for reciprocation in the casing, and a discharge in communication with the ports of the casing, the said valve having an open inlet end and being provided adjacent both ends with ports in communication alternately with the respective ports of the said casing and having by-pass passages for communication alternately with the said respective ports.

13. In milking apparatus, milk-receiving chambers, means for alternately creating suction and compression in said chambers, a tubular valve casing having ports communicating with the interior of the chambers, a discharge having branches leading from the ports of said casing, a tubular valve slidably mounted in the said casing and provided with inlet ports to communicate with the first-mentioned ports of the casing and outwardly beyond the inlet ports with by-passes for establishing communication between the first and last-mentioned ports of the said casing, the said valve having an open inlet end.

In testimony whereof I affix my signature.

JOHN C. BEEM. [L. S.]